US008163663B2

(12) United States Patent
Lai et al.

(10) Patent No.: US 8,163,663 B2
(45) Date of Patent: Apr. 24, 2012

(54) MULTIFUNCTIONAL ANTISTATIC NON-WOVEN FABRIC AND FABRICATION METHOD THEREOF

(75) Inventors: Wei-Jen Lai, Taipei County (TW); Sheng-Shan Chang, Taipei County (TW)

(73) Assignee: Taiwan Textile Research Institute, Taipei County (TW)

( * ) Notice: Subject to any disclaimer, the term of this patent is extended or adjusted under 35 U.S.C. 154(b) by 78 days.

(21) Appl. No.: 12/463,565

(22) Filed: May 11, 2009

(65) Prior Publication Data

US 2010/0159779 A1 Jun. 24, 2010

Related U.S. Application Data

(63) Continuation of application No. 12/318,358, filed on Dec. 29, 2008, now abandoned.

(30) Foreign Application Priority Data

Dec. 22, 2008 (TW) ................................ 97149969 A

(51) Int. Cl.
*B32B 5/02* (2006.01)

(52) U.S. Cl. ......... 442/110; 442/400; 252/502; 252/511

(58) Field of Classification Search .................. 442/110, 442/400

See application file for complete search history.

(56) References Cited

U.S. PATENT DOCUMENTS

| | | | | |
|---|---|---|---|---|
| 4,085,182 | A * | 4/1978 | Kato | 264/105 |
| 6,451,427 | B1 * | 9/2002 | Takashima | 428/372 |

* cited by examiner

*Primary Examiner* — Lynda Salvatore
(74) *Attorney, Agent, or Firm* — Rosenberg, Klein & Lee

(57) ABSTRACT

The invention provides a conductive powder composite including a bamboo charcoal powder pre-processed with a pulverizing procedure and a refining procedure of 900 to 1500° C. and a conductive carbon black powder, wherein the bamboo charcoal powder and the conductive carbon black powder are blended by a high speed mechanical granulating machine to form the conductive powder composite. The conductive powder composite can simultaneously and effectively improve the poor conductivity of the bamboo charcoal powder and the embrittlement characteristic of the conductive carbon black powder in the conventional technology. The invention also provides a conductive masterbatch and a fabrication method thereof, and a multifunctional antistatic non-woven fabric and a fabrication method thereof.

16 Claims, 3 Drawing Sheets

MULTIFUNCTIONAL ANTISTATIC NON-WOVEN FABRIC AND FABRICATION METHOD THEREOF

CROSS-REFERENCE TO RELATED APPLICATIONS

This Patent application is a Continuation Application of Ser. No. 12/318,358, filed on 29 Dec. 2008, now abandoned.

FIELD OF THE INVENTION

The present invention relates generally to an antistatic non-woven fabric and the fabrication method thereof. More particularly, the present invention relates to a conductive powder composite containing a bamboo charcoal powder and a conductive carbon black powder, a conductive masterbatch fabricated from the conductive powder composite and a fabrication method thereof, and an antistatic non-woven fabric fabricated from the conductive masterbatch and a fabrication method thereof.

BACKGROUND OF THE INVENTION

In the electronic industry, protective clothing is used to separate human body from the clean room for production. As the wearer moves his or her arms and legs, electrostatic charge can be accumulated on the clothing. The accumulated electrostatic charge can be imparted to semiconductor devices, which would result in the electrostatic discharge (ESD) damage. Therefore, the protective clothing used should have antistatic effect or ESD protection effect.

Generally, the protective clothing with antistatic effect is manufactured by incorporating conductive yarn into antistatic fabric. The conductive yarn is usually composed of filaments having a conductive core or shell containing carbon black or graphite or conductive metal, filaments of metallic fiber, or filaments coated with conductive material.

The antistatic fabric mentioned above is known from the art that clothing made from the antistatic fabric does not have good permeability for wearing since the fibers are woven in dense structure in order to provide sufficient antistatic effect.

To solve the above problem, Taiwan Patent No. I232248 (also published as German Patent No. DE 19934442 A1) provides a non-woven material and a fabrication thereof, wherein the antistatic effect is achieved by blending carbon black or graphite into the polymer material. However, it is known from the art that directly blending carbon black into the polymer will result in embrittlement issue of the material, which leads to the process problem.

Furthermore, U.S. Pat. No. 6,451,427B1 discloses a fiber containing bamboo charcoal powder. Although the bamboo charcoal is superior in deodorization and hygroscopicity, it is difficult to keep color substantially uniform since the particle diameter is relatively large. Making the particle diameter small is desirable, but in that case, said deodorization and hygroscopicity effects will decrease. Thus, by blending fine particle diameter of carbon black, it will be possible to achieve the deodorization and hygroscopicity effects and keep color substantially uniform. However, the conductivity issue was not mentioned in U.S. Pat. No. 6,451,427B1. Particularly, the specific ratio of the bamboo charcoal with respect to carbon black for achieving necessary antistatic effect was not disclosed.

Thus, a requirement still remains for a multifunctional antistatic non-woven fabric material with multiple functions of having appropriate mechanical process and having antistatic, deodorization and hygroscopicity effects.

Solutions to these problems have been long sought but prior developments have not taught or suggested any solutions and, thus, solutions to these problems have long eluded those skilled in the art.

SUMMARY OF THE INVENTION

An objective of the present invention is to provide a multifunctional antistatic non-woven fabric material with multiple functions of having appropriate mechanical process and having antistatic, deodorization and hygroscopicity effects.

The present invention provides a conductive powder composite, comprising: a bamboo charcoal powder pre-processed with a pulverizing procedure and a refining procedure of 900 to 1500° C.; and a conductive carbon black powder, wherein the bamboo charcoal powder and the conductive carbon black powder are blended by a high speed mechanical granulating machine to form the conductive powder composite.

In the high speed mechanical granulating machine, by the mechanical force with multiple directions and the high speed rotation, the bamboo charcoal powder and the conductive carbon black powder are fully mixed, rubbed, and blended, such that the grain size of the bamboo charcoal powder is refined and the conductive carbon black powder is uniformly coated on the surface of the bamboo charcoal powder.

Preferably, the bamboo charcoal powder is contained in an amount ranging from 25 to 75% by weight based on the total weight of the conductive powder composite. The bamboo charcoal powder is used for providing the deodorization and hygroscopicity effects and forming a portion of the conductive path. If the content of the bamboo charcoal powder is decreased below the range, the deodorization and hygroscopicity effects will be decreased. If the content of the bamboo charcoal powder is increased beyond the range, the conductivity will be lowered since the content of the conductive carbon black powder is decreased correspondingly, which could fail to provide sufficient antistatic effect.

Preferably, the conductive carbon black powder is contained in an amount ranging from 25 to 75% by weight based on the total weight of the conductive powder composite. The conductive carbon black powder is used for providing the antistatic effect. If the content of the conductive carbon black powder is decreased below the range, the antistatic effect will be decreased. If the content of the conductive carbon black powder is increased beyond the range, the deodorization and hygroscopicity effects will be lowered since the content of the bamboo charcoal powder is decreased correspondingly and the process will be worsened since the carbon black contained will result in embrittlement problem of the product.

Preferably, volume resistivity of the conductive powder composite is within a range of from $10^0$ to $10^2$ ohm-cm.

The present invention further provides a conductive powder composite, comprising: a bamboo charcoal powder preprocessed with a pulverizing procedure and a refining procedure of 900 to 1500° C.; and a conductive carbon black powder, wherein the bamboo charcoal powder and the conductive carbon black powder are blended by a high speed agitating machine to form the conductive powder composite.

In the high speed agitating machine, by the agitating motion with multiple directions, the bamboo charcoal powder and the conductive carbon black powder are fully mixed, rubbed, and blended, such that the grain size of the bamboo charcoal powder is refined and the conductive carbon black powder is uniformly coated on the surface of the bamboo charcoal powder.

The present invention further provides a conductive masterbatch, comprising: (A) 5 to 50% by weight of a conductive powder composite as stated above, based on the total weight of the conductive masterbatch; (B) 5 to 25% by weight of a dispersant, based on the total weight of the conductive masterbatch; and (C) balance to 100% of a polymer material, wherein said components (A) to (C) are compounded by using an extruder to form the conductive masterbatch.

Preferably, the conductive powder composite is contained in an amount ranging from 5 to 30% by weight based on the total weight of the conductive masterbatch. The conductive powder composite is used for providing the deodorization, hygroscopicity and antistatic effects. If the content of the conductive powder composite is decreased below the range, the deodorization, hygroscopicity and antistatic effects will be decreased. If the content of the conductive powder composite is increased beyond the range, the conductive powder composite could fail to be fully dispersed in the polymer material since the content of the dispersant is decreased correspondingly.

Preferably, the dispersant is contained in an amount ranging from 5 to 20% by weight based on the total weight of the conductive masterbatch. The dispersant is used for uniformly dispersing the conductive powder composite in the polymer matrix. If the content of the dispersant is decreased below the range, the conductive powder composite could fail to be fully dispersed in the polymer matrix. If the content of the dispersant is increased beyond the range, the process could be worsened, the production cost will be increased and the deodorization, hygroscopicity and antistatic effects will be decreased since the content of the conductive powder composite is decreased correspondingly.

Preferably, the dispersant is polyolefine-based copolymer, polyester-based copolymer, polyamide-based copolymer, silane coupling agent, titanium coupling agent or montanic wax. More preferably, the dispersant is a combination of polyester-based copolymer and montanic wax.

Preferably, the polymer material is PTT (polytrimethylene terephthalate), PBT (polybutylene terephthalate), PET (polyethylene terephthalate), PP (polypropylene), PE (polyethylene), Nylon 6 (polyamide 6), Nylon 6,12 (polyamide 6,12), Nylon 6,6 (polyamide 6,6) or a combination thereof. More preferably, the polymer material is PBT (polybutylene terephthalate).

Preferably, surface resistivity of the conductive masterbatch is within a range of from $10^3$ to $10^6$ ohm/sq.

The present invention further provides a method of fabricating a conductive masterbatch, comprising the steps of: (a) providing a conductive powder composite as stated above, in an amount ranging from 5 to 50% by weight based on the total weight of the conductive masterbatch; (b) providing a dispersant, in an amount ranging from 5 to 25% by weight based on the total weight of the conductive masterbatch; (c) providing a polymer material balance to 100% by weight of the conductive masterbatch; and (d) compounding the conductive powder composite, the dispersant, and the polymer material by an extruder to form the conductive masterbatch.

The present invention further provides a method of fabricating a multifunctional antistatic non-woven fabric, comprising the steps of: (I) providing a conductive masterbatch as stated above; and (II) feeding the conductive masterbatch into a melt-blown machine, the conductive masterbatch being melt-blown through a nozzle and extended to form a fiber by a gas flow of 220 to 300° C. with a flow rate of 2,000 to 4,000 m/min, and then the fiber being spray on a steel net to form the multifunctional antistatic non-woven fabric.

The present invention further provides a multifunctional antistatic non-woven fabric fabricated from the method of fabricating a multifunctional antistatic non-woven fabric as stated above.

Preferably, surface resistivity of the multifunctional antistatic non-woven fabric is within a range of from $10^5$ to $10^{10}$ ohm/sq.

Certain embodiments of the invention have other aspects in addition to or in place of those mentioned above. The aspects will become apparent to those skilled in the art from a reading of the following description when taken with reference to the accompanying drawings.

BRIEF DESCRIPTION OF THE DRAWINGS

Relevant embodiments of the present invention will be described in detail below with reference to the accompanying drawings, in which.

DETAIL DESCRIPTION OF THE PREFERRED EMBODIMENT

The following embodiments are described in sufficient detail to enable those skilled in the art to make and use the invention. It is to be understood that other embodiments would be evident based on the present disclosure, and that process and mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known configurations and process steps are not disclosed in detail.

Figure 1:
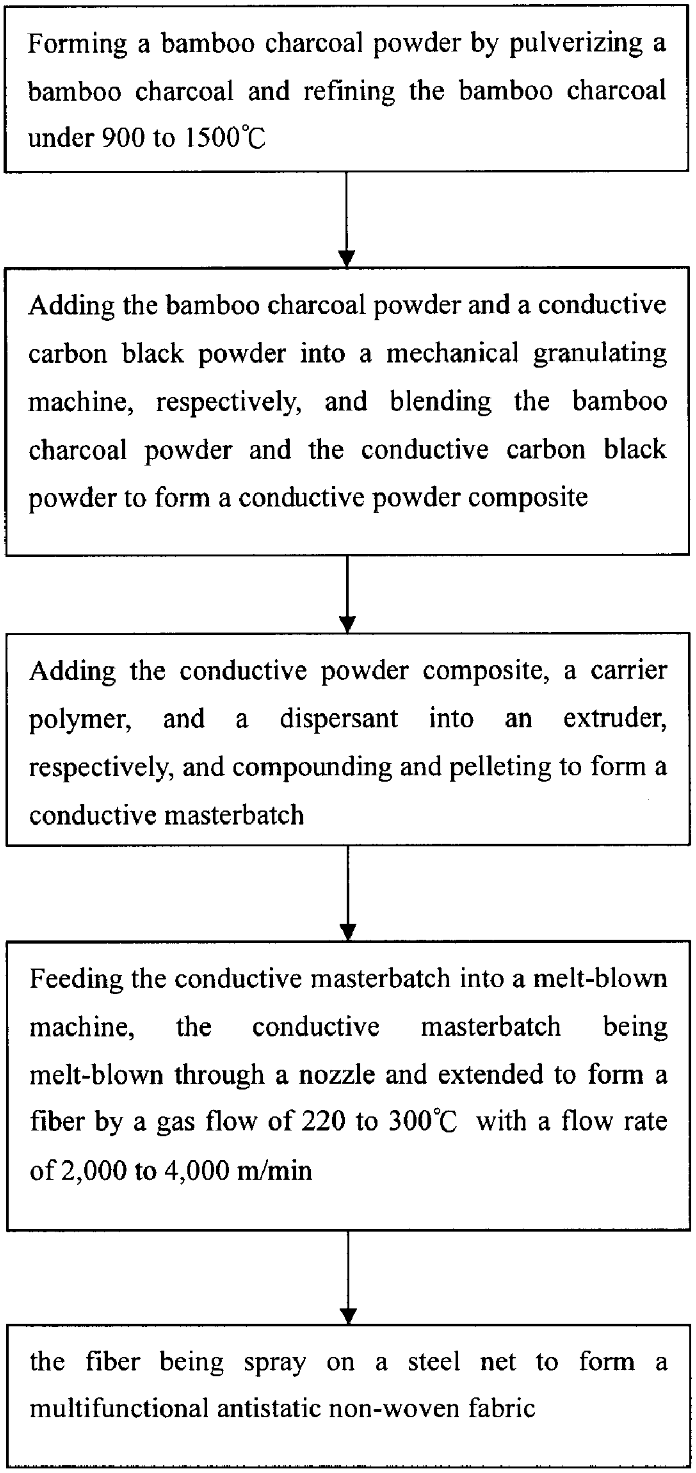
FIG. 1 is a flow chart of a method of fabricating a multifunctional antistatic non-woven fabric in accordance with an embodiment of the present invention.

FIG. 1 is a flow chart of a method of fabricating a multifunctional antistatic non-woven fabric in accordance with an embodiment of the present invention.

First of all, a bamboo charcoal powder was formed by pulverizing a bamboo charcoal and refining the bamboo charcoal under 900 to 1500° C. Traditional bamboo charcoal burned at 500 to 750° C. can be used as the bamboo charcoal. The bamboo charcoal was first pulverized to refine the grain size of the powder and then the refined powder was added into a high temperature oven with 900 to 1500° C. After refining under high temperature for 1 to 4 hours, the bamboo charcoal powder was formed.

Commercial conductive carbon black (commercial product XE2B made by the DEGUSSA company, with a particle size of 30 nm and with dibutyl phthalate (DBP) adsorption value of 420 ml/100 g) was employed as the other component of the conductive powder composite.

The bamboo charcoal powder and the conductive carbon black powder were added into a mechanical granulating machine (commercial equipment AMS-LAB made by the HOSOKAWA company), respectively, to form the conductive powder composite. The bamboo charcoal powder and the conductive carbon black powder were mechanical fusion for about 5 minutes in the mechanical granulating machine with the operation parameters of 2.2 kW of power and 2480 rpm of rotation speed. In the high speed mechanical granulating machine, by the mechanical force with multiple directions and the high speed rotation, the bamboo charcoal powder and the conductive carbon black powder were fully mixed, rubbed, and blended, such that the grain size of the bamboo charcoal powder was refined and the conductive carbon black powder was uniformly coated on the surface of the bamboo charcoal powder.

Figure 2:
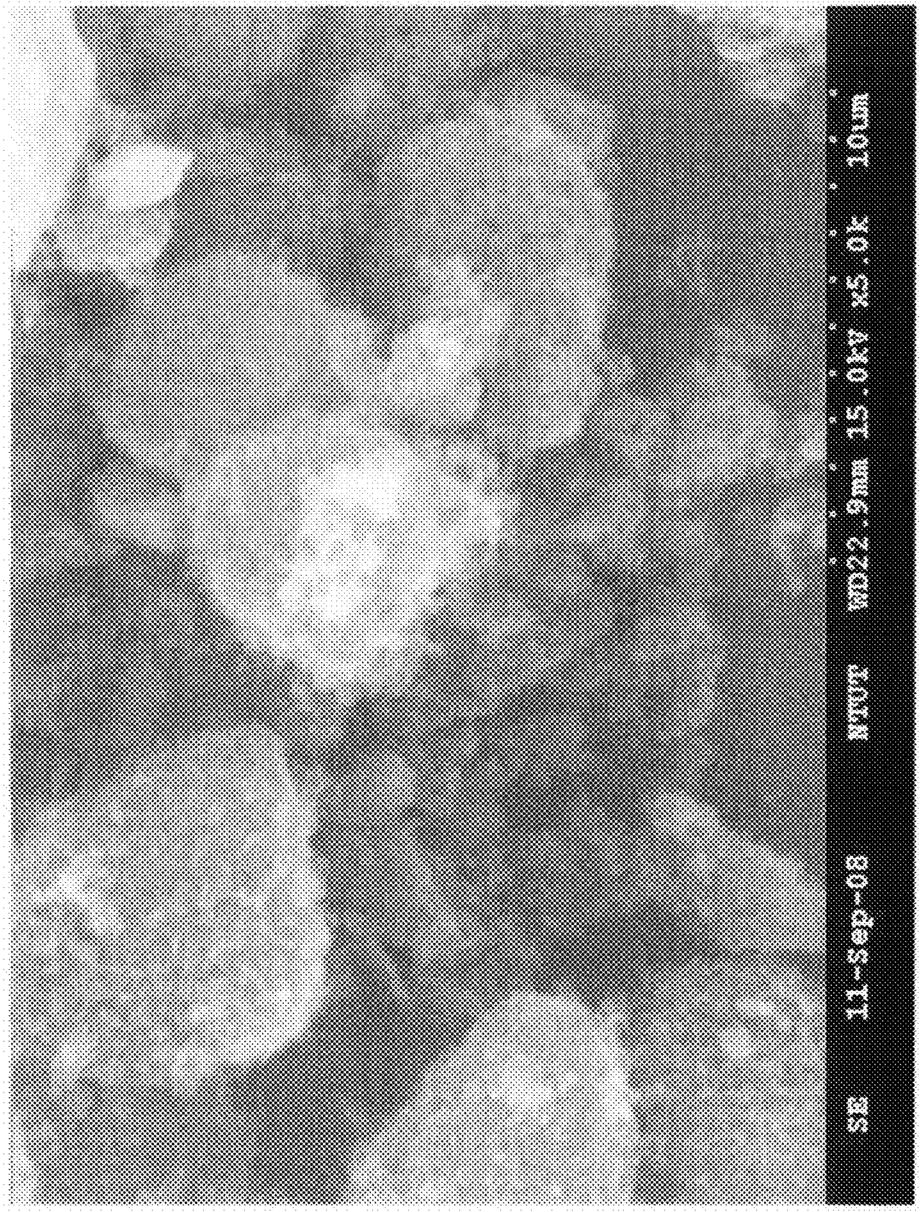
FIG. 2 is a SEM picture of the conductive powder composite in accordance with an embodiment of the present invention.

The blended conductive powder composite of the present invention is shown in the SEM picture of FIG. 2, wherein the bulk area represents the bamboo charcoal powder. From FIG. 2, it is understood that the surface of the bamboo charcoal powder is uniformly coated with the conductive carbon black powder.

Then, the conductive powder composite, a carrier polymer, and a dispersant were added into an extruder, respectively. The conductive powder composite, the carrier polymer, and the dispersant were compounded and pelleted in the extruder to form a conductive masterbatch.

Suitable extruder can be used, without limitation, for forming the conductive masterbatch of the present invention. For example, commercial extruder CK-32HT made by the CHENG YIEU company can be used.

Suitable polymer material can be used, without limitation, for serving as the polymer carrier and forming the conductive masterbatch with the conductive powder composite. Exemplary polymer material includes, without limitation: PTT (polytrimethylene terephthalate), PBT (polybutylene terephthalate), PET (polyethylene terephthalate), PP (polypropylene), PE (polyethylene), Nylon 6 (polyamide 6), Nylon 6,12 (polyamide 6,12), Nylon 6,6 (polyamide 6,6) or a combination thereof. For example, commercial PBT (polybutylene terephthalate) of 1200M made by the CHANG CHUN company can be used.

Suitable dispersant can be used, without limitation, for dispersing the conductive powder composite in the polymer material. Exemplary dispersant includes, without limitation: polyolefine-based copolymer, polyester-based copolymer, nylon-based copolymer, silane coupling agent, titanium coupling agent or montanic wax. For example, a combination of polyester-based copolymer 1533E made by the EMS-GRIVORY company and montanic wax LICOWAX OP made by the CLARIANT company can be used.

Subsequently, the conductive masterbatch was fed into a melt-blown machine. The conductive masterbatch was melt-blown through a nozzle of about 500 μm and extended to form a fiber by a gas flow of 220 to 300° C. with a flow rate of 2,000 to 4,000 m/min. The fiber was then spray on a steel net to form a multifunctional antistatic non-woven fabric.

Suitable melt-blown machine can be used, without limitation, for forming non-woven fabric. For example, the melt-blown machine made by the YI-SHANG company can be used.

In the following description, several exemplary examples are given to provide a thorough understanding of the deodorization and antistatic effects of the invention.

Example 1

100 parts of the conductive carbon black powder were added into a mechanical granulating machine (commercial equipment AMS-LAB made by the HOSOKAWA company). The conductive carbon black powder was blended for about 5 minutes in the mechanical granulating machine with the operation parameters of 2.2 kW of power and 2480 rpm of rotation speed, to form the conductive powder composite of Example 1.

Example 2

75 parts of the conductive carbon black powder and 25 parts of the bamboo charcoal powder were added into a mechanical granulating machine (commercial equipment AMS-LAB made by the HOSOKAWA company), respectively. The bamboo charcoal powder and the conductive carbon black powder were blended for about 5 minutes in the mechanical granulating machine with the operation parameters of 2.2 kW of power and 2480 rpm of rotation speed, to form the conductive powder composite of Example 2.

Example 3

50 parts of the conductive carbon black powder and 50 parts of the bamboo charcoal powder were added into a mechanical granulating machine (commercial equipment AMS-LAB made by the HOSOKAWA company), respectively. The bamboo charcoal powder and the conductive carbon black powder were blended for about 5 minutes in the mechanical granulating machine with the operation parameters of 2.2 kW of power and 2480 rpm of rotation speed, to form the conductive powder composite of Example 3.

Example 4

25 parts of the conductive carbon black powder and 75 parts of the bamboo charcoal powder were added into a mechanical granulating machine (commercial equipment AMS-LAB made by the HOSOKAWA company), respectively. The bamboo charcoal powder and the conductive carbon black powder were blended for about 5 minutes in the mechanical granulating machine with the operation parameters of 2.2 kW of power and 2480 rpm of rotation speed, to form the conductive powder composite of Example 4.

Example 5

100 parts of the bamboo charcoal powder were added into a mechanical granulating machine (commercial equipment AMS-LAB made by the HOSOKAWA company). The bamboo charcoal powder was blended for about 5 minutes in the mechanical granulating machine with the operation parameters of 2.2 kW of power and 2480 rpm of rotation speed, to form the conductive powder composite of Example 5.

Volume resistivity of the conductive powder composite were measured for examples 1 to 5, respectively, by using the commercial resistivity meter MCP-T610 made by the MITSUBISHI CHEMICAL ANALYTECH CO., LTD company. The operating conditions and the results obtained are summarized in the following table.

TABLE 1

Comparison of volume resistivity of the conductive powder composite, with respect to the content of the conductive carbon black powder (CCB) and the bamboo charcoal powder (BC) in the conductive powder composite

| | CCB:BC in the conductive powder composite | Volume resistivity (Ω-cm) of the conductive powder composite |
|---|---|---|
| Example 1 | 100:0 | $4.2 \times 10^{0}$ |
| Example 2 | 75:25 | $2.1 \times 10^{1}$ |
| Example 3 | 50:50 | $2.1 \times 10^{1}$ |
| Example 4 | 25:75 | $3.1 \times 10^{1}$ |
| Example 5 | 0:100 | $4.7 \times 10^{1}$ |

From Table 1, it is understood that pure conductive carbon black powder has the lowest volume resistivity of $4.2\times10^{0}$ Ω-cm. As the content of the bamboo charcoal powder in the conductive powder composite is increased, the volume resistivity of the conductive powder composite is increased correspondingly.

In the following description, several exemplary examples are given to provide a thorough understanding of the antistatic effect of the conductive masterbatch and the multifunctional antistatic non-woven fabric of the invention.

Example 6

10 parts of the conductive powder composite of Example 1, 10 parts of the dispersant and 80 parts of PBT (polybutylene terephthalate) were added into an extruder, respectively. The conductive powder composite, the carrier polymer PBT, and the dispersant were compounded and pelleted in the extruder to form a conductive masterbatch of Example 6. Subsequently, the conductive masterbatch was fed into a melt-blown machine. The conductive masterbatch was melt-blown through a nozzle of about 500 μm and extended to form a fiber by a gas flow of 250 to 270° C. with a flow rate of 2,000 to 4,000 m/min. The fiber was then spray on a steel net to form a multifunctional antistatic non-woven fabric of Example 6.

Example 7

10 parts of the conductive powder composite of Example 2, 10 parts of the dispersant and 80 parts of PBT (polybutylene terephthalate) were added into an extruder, respectively. The conductive powder composite, the carrier polymer PBT, and the dispersant were compounded and pelleted in the extruder to form a conductive masterbatch of Example 7. Subsequently, the conductive masterbatch was fed into a melt-blown machine. The conductive masterbatch was melt-blown through a nozzle of about 500 μm and extended to form a fiber by a gas flow of 250 to 270° C. with a flow rate of 2,000 to 4,000 m/min. The fiber was then spray on a steel net to form a multifunctional antistatic non-woven fabric of Example 7.

Example 8

10 parts of the conductive powder composite of Example 3, 10 parts of the dispersant and 80 parts of PBT (polybutylene terephthalate) were added into an extruder, respectively. The conductive powder composite, the carrier polymer PBT, and the dispersant were compounded and pelleted in the extruder to form a conductive masterbatch of Example 8. Subsequently, the conductive masterbatch was fed into a melt-blown machine. The conductive masterbatch was melt-blown through a nozzle of about 500 μm and extended to form a fiber by a gas flow of 250 to 270° C. with a flow rate of 2,000 to 4,000 m/min. The fiber was then spray on a steel net to form a multifunctional antistatic non-woven fabric of Example 8.

Example 9

10 parts of the conductive powder composite of Example 4, 10 parts of the dispersant and 80 parts of PBT (polybutylene terephthalate) were added into an extruder, respectively. The conductive powder composite, the carrier polymer PBT, and the dispersant were compounded and pelleted in the extruder to form a conductive masterbatch of Example 9. Subsequently, the conductive masterbatch was fed into a melt-blown machine. The conductive masterbatch was melt-blown through a nozzle of about 500 μm and extended to form a fiber by a gas flow of 250 to 270° C. with a flow rate of 2,000 to 4,000 m/min. The fiber was then spray on a steel net to form a multifunctional antistatic non-woven fabric of Example 9.

Example 10

10 parts of the conductive powder composite of Example 5, 10 parts of the dispersant and 80 parts of PBT (polybutylene terephthalate) were added into an extruder, respectively. The conductive powder composite, the carrier polymer PBT, and the dispersant were compounded and pelleted in the extruder to form a conductive masterbatch of Example 10. Subsequently, the conductive masterbatch was fed into a melt-blown machine. The conductive masterbatch was melt-blown through a nozzle of about 500 μm and extended to form a fiber by a gas flow of 250 to 270° C. with a flow rate of 2,000 to 4,000 m/min. The fiber was then spray on a steel net to form a multifunctional antistatic non-woven fabric of Example 10.

Surface resistivity of the conductive masterbatch and the multifunctional antistatic non-woven fabric were measured for examples 6 to 10, respectively, by using the commercial resistivity meter MCP-T610 made by the MITSUBISHI CHEMICAL ANALYTECH CO., LTD company and the commercial surface resistivity meter EB-2001 made by the EVEN BETTER TECH. CO., LTD. company. The operating conditions and the results obtained are summarized in the following table.

TABLE 2

Comparison of surface resistivity of the conductive masterbatch and surface resistivity of the multifunctional antistatic non-woven fabric, with respect to the content of the conductive carbon black powder (CCB) and the bamboo charcoal powder (BC) in the conductive powder composite

| | CCB:BC in the conductive powder composite | Surface resistivity (Ω/sq) of the conductive masterbatch | Surface resistivity (Ω/sq) of the multifunctional antistatic non-woven fabric |
|---|---|---|---|
| Example 6 | 100:0 | $2.3 \times 10^3$ | $8.8 \times 10^5$ |
| Example 7 | 75:25 | $2.3 \times 10^3$ | $2.9 \times 10^6$ |
| Example 8 | 50:50 | $2.3 \times 10^4$ | $1.2 \times 10^8$ |
| Example 9 | 25:75 | $10^{10}$ | $>10^{12}$ |
| Example 10 | 0:100 | $>10^{12}$ | $>10^{12}$ |

From Table 2, it is understood that the multifunctional antistatic non-woven fabric made from pure conductive carbon black powder has the lowest surface resistivity of $8.8\times10^5$ Ω/sq. As the content of the bamboo charcoal powder in the conductive powder composite is increased, the surface resistivity of the conductive powder composite is increased correspondingly. However, when the multifunctional antistatic non-woven fabric is made from pure bamboo charcoal powder, the surface resistivity will be higher than $10^{12}$ Ω/sq, such that the conductivity is poor for providing sufficient antistatic effect.

In the following description, several exemplary examples are given to provide a thorough understanding of the far-infrared effect of the multifunctional antistatic non-woven fabric of the invention.

Example 11

A multifunctional antistatic non-woven fabric of Example 11 was obtained in accordance with the fabrication method of Example 8. The multifunctional antistatic non-woven fabric of Example 11 was then cut into small blocks with a dimension of 10 cm×10 cm to be the sample for far-infrared test.

Comparative Example 1

100 parts of PBT (polybutylene terephthalate) were added into an extruder, and compounded and pelleted in the extruder to form a conductive masterbatch of Comparative Example 1. Subsequently, the conductive masterbatch was fed into a melt-blown machine. The conductive masterbatch was melt-blown through a nozzle of about 500 μm and extended to form a fiber by a gas flow of 250 to 270° C. with a flow rate of 2,000 to 4,000 m/min. The fiber was then spray on a steel net to form a non-woven fabric of Comparative Example 1. The non-woven fabric of Comparative Example 1 was then cut into small blocks with a dimension of 10 cm×10 cm to be the sample for far-infrared test.

Figure 3:
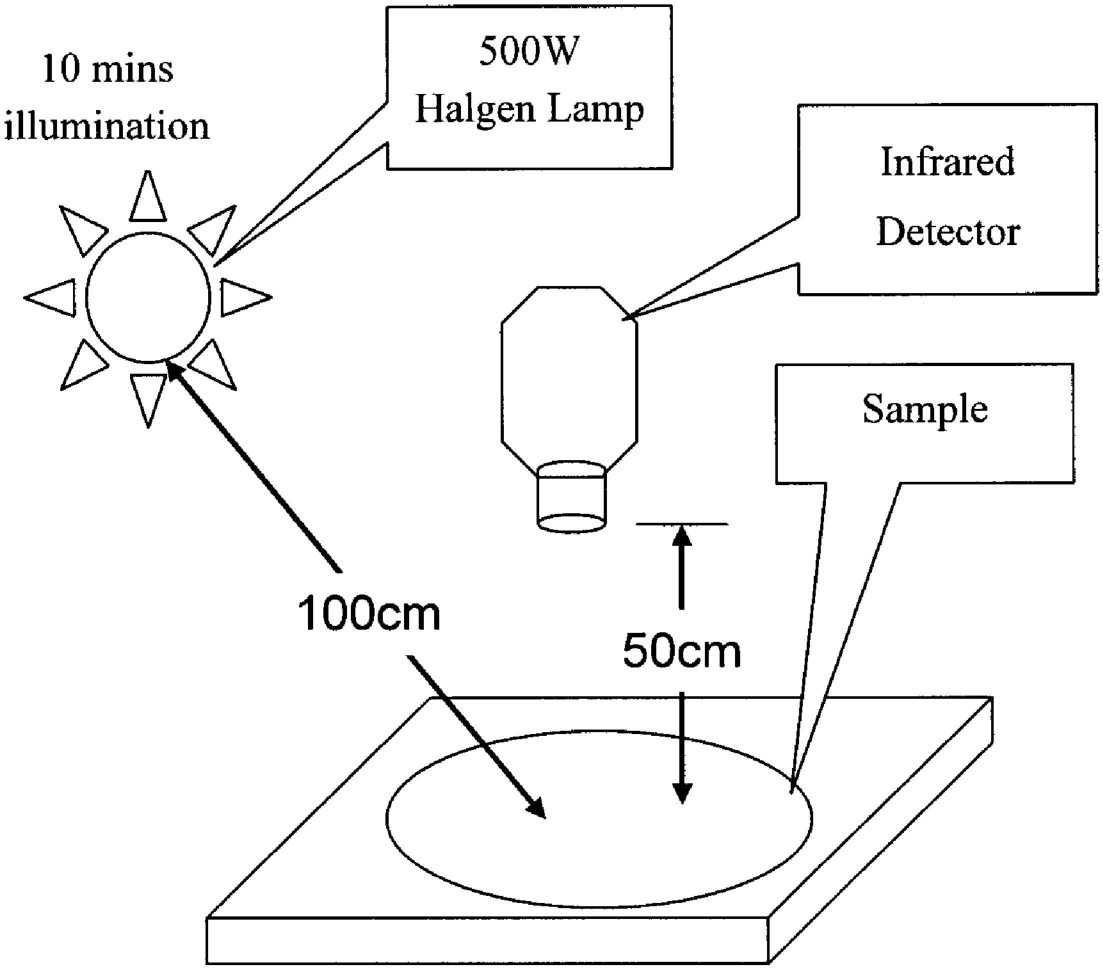
FIG. 3 is a schematic diagram of the metrology for measuring the far-infrared effect.

A far-infrared detection metrology, as shown in FIG. 3, was used to measure the far-infrared effect of the non-woven fabric. In the far-infrared detection metrology, 500 W halogen lamp was used as the heat source and spaced a distance 100 cm from the testing sample. A Thermo Vision infrared detector was used to detect the temperature before illumination (T1), the temperature after 10 minutes illumination (T2), and the cooling down temperature after turning off the heat source for 30 seconds (T3). The operating conditions and the results obtained are summarized in the following table.

TABLE 3

Far-infrared test of the non-woven fabric

| | (T1) (° C.) | (T2) (° C.) | (T3) (° C.) | (T2 − T1) (° C.) | (T3 − T1) (° C.) |
|---|---|---|---|---|---|
| Example 11 | 22.09 | 48.44 | 26.87 | 26.35 | 4.78 |
| Comparative Example 1 | 22.18 | 25.36 | 22.28 | 3.18 | 0.1 |

From Table 3, it is understood that the temperature difference between T2 and T1 for the multifunctional antistatic non-woven fabric of Example 11 is 26.35° C., and the temperature difference between T2 and T1 for the non-woven fabric of Comparative Example 1 is 3.18° C. Apparently, compared with the non-woven fabric without the conductive powder composite of the present invention, the multifunctional antistatic non-woven fabric of the present invention has better performance for heat absorption and heating effect. It is believed that the bamboo charcoal contained in the multifunctional antistatic non-woven fabric of the present invention can further radiate far-infrared radiation after absorbing the energy from the heat source, which leads to the heating effect of the multifunctional antistatic non-woven fabric.

Furthermore, the temperature difference between T3 and T1 for the multifunctional antistatic non-woven fabric of Example 11 is 4.78° C., and the temperature difference between T3 and T1 for the non-woven fabric of Comparative Example 1 is 0.1° C. It is understood that compared with the non-woven fabric without the conductive powder composite of the present invention, the multifunctional antistatic non-woven fabric of the present invention has better performance for heat preservation. Thus, the clothes made from the multifunctional antistatic non-woven fabric of the present invention will have better heat preservation performance.

In the following description, several exemplary examples are given to provide a thorough understanding of the deodorization effect of the multifunctional antistatic non-woven fabric of the invention.

Deodorization effect was measured with a conventional detection tube method in accordance with the evaluation test method of JAFET. 1 g of the sample was placed in a 5 L Tedlar bag containing an initial gas $NH_3$ of 3 L-100 ppm. The concentrations of the gas $NH_3$ were detected in the beginning ($C_{initial}$) and after 1 hour ($C_{post}$), respectively. Deodorization rate is then calculated by the following formula:

$$\text{Deodorization rate}=(C_{initial}-C_{post})/C_{initial}\times 100\%$$

Example 12

A multifunctional antistatic non-woven fabric of Example 12 was obtained in accordance with the fabrication method of Example 7. The multifunctional antistatic non-woven fabric of Example 12 was then cut into small blocks. A total weight of about 1 g was used for measuring the deodorization effect.

The concentration of the gas $NH_3$ was detected by the detection tube before placing the sample of Example 12 into the 5 L Tedlar bag. The concentration $C_{initial}$ detected was 122 ppm. Subsequently, 1 g of the sample of the multifunctional antistatic non-woven fabric of Example 12 was put into the 5 L Tedlar bag. After 1 hour, the concentration of the gas $NH_3$ was detected again by the detection tube. The concentration $C_{post}$ detected was 57.5 ppm. The deodorization rate calculated is 53%.

Comparative Example 2

A non-woven fabric of Comparative Example 2 was obtained in accordance with the fabrication method of Comparative Example 1. The non-woven fabric of Comparative Example 2 was then cut into small blocks. A total weight of about 1 g was used for measuring the deodorization effect.

The concentration of the gas $NH_3$ was detected by the detection tube before placing the sample of Comparative Example 2 into the 5 L Tedlar bag. The concentration $C_{initial}$ detected was 107 ppm. Subsequently, 1 g of the sample of the non-woven fabric of Comparative Example 2 was put into the 5 L Tedlar bag. After 1 hour, the concentration of the gas $NH_3$ was detected again by the detection tube. The concentration $C_{post}$ detected was 60 ppm. The deodorization rate calculated is 43%.

The operating conditions and the results obtained are summarized in the following table.

TABLE 4

Deodorization test of the non-woven fabric

| | $C_{initial}$ (ppm) | $C_{post}$ (ppm) | Deodorization rate (%) |
|---|---|---|---|
| Example 12 | 122 | 57.5 | 53 |
| Comparative Example 2 | 107 | 60 | 43 |

From Table 4, it is understood that compared with the non-woven fabric without the conductive powder composite of the present invention, the multifunctional antistatic non-woven fabric of the present invention has better performance for deodorization. It is believed that since the bamboo charcoal is porous, the bamboo charcoal powder contained in the multifunctional antistatic non-woven fabric of the present invention can be used to absorb the gas molecules of $NH_3$, such that the deodorization effect is improved.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

The invention claimed is:

1. A conductive powder composite, comprising:

a bamboo charcoal powder pre-processed with a pulverizing procedure and a refining procedure of 900 to 1500° C.; and a conductive carbon black powder, wherein the bamboo charcoal powder and the conductive carbon black powder are blended by a high speed mechanical granulating process to form the conductive powder composite, wherein the bamboo charcoal powder is provided in granular form having a substantially uniform surface coating of the carbon powder.

2. The conductive powder composite according to claim 1, wherein the bamboo charcoal powder is contained in an amount ranging from 25 to 75% by weight based on the total weight of the conductive powder composite.

3. The conductive powder composite according to claim 1, wherein the conductive carbon black powder is contained in an amount ranging from 25 to 75% by weight based on the total weight of the conductive powder composite.

4. The conductive powder composite according to claim 1, wherein volume resistivity of the conductive powder composite is within a range of from $10^0$ to $10^2$ ohm-cm.

5. A conductive powder composite, comprising:

a bamboo charcoal powder pre-processed with a pulverizing procedure and a refining procedure of 900 to 1500° C.; and a conductive carbon black powder, wherein the bamboo charcoal powder and the conductive carbon black powder are blended by a high speed mechanical agitating process to form the conductive powder composite, wherein the bamboo charcoal powder is provided in granular form having a substantially uniform surface coating of the carbon powder.

6. The conductive powder composite according to claim 5, wherein the bamboo charcoal powder is contained in an amount ranging from 25 to 75% by weight based on the total weight of the conductive powder composite.

7. The conductive powder composite according to claim 5, wherein the conductive carbon black powder is contained in an amount ranging from 25 to 75% by weight based on the total weight of the conductive powder composite.

8. The conductive powder composite according to claim 5, wherein volume resistivity of the conductive powder composite is within a range of from $10^0$ to $10^2$ ohm-cm.

9. A conductive masterbatch, comprising:

(A) 5 to 50% by weight of a conductive powder composite including a bamboo charcoal powder and a conductive carbon black powder, based on the total weight of the conductive masterbatch, wherein the bamboo charcoal powder is provided in granular form having a substantially uniform surface coating of the carbon powder, (B) 5 to 25% by weight of a dispersant, based on total weight of the conductive masterbatch; and (C) balance to 100% of a polymer material, wherein said components (A) to (C) are compounded by using an extruder to form the conductive masterbatch.

10. The conductive masterbatch according to claim 9, wherein the conductive powder composite is contained in an amount ranging from 5 to 30% by weight based on the total weight of the conductive masterbatch.

11. The conductive masterbatch according to claim 9, wherein the dispersant is contained in an amount ranging from 5 to 20% by weight based on the total weight of the conductive masterbatch.

12. The conductive masterbatch according to claim 9, wherein the dispersant is polyolefine-based copolymer, polyester-based copolymer, nylon-based copolymer, silane coupling agent, titanium coupling agent or montanic wax.

13. The conductive masterbatch according to claim 12, wherein the dispersant is a combination of polyester-based copolymer and montanic wax.

14. The conductive masterbatch according to claim 9, wherein the polymer material is PTT (polytrimethylene terephthalate), PBT (polybutylene terephthalate), PET (polyethylene terephthalate), PP (polypropylene), PE (polyethylene), Nylon 6 (polyamide 6), Nylon 6, 12 (polyamide 6,12), Nylon 6,6 (polyamide 6,6) or combination thereof.

15. The conductive masterbatch according to claim 14, wherein the polymer material is PBT (polybutylene terepthalate).

16. The conductive masterbatch according to claim 9, wherein surface resistivity of the conductive masterbatch is within a range from $10^3$ to $10^6$ ohm/sq.

* * * * *